(12) United States Patent
Matsumoto et al.

(10) Patent No.: US 8,332,431 B2
(45) Date of Patent: Dec. 11, 2012

(54) CONFIGURATION INFORMATION MANAGEMENT APPARATUS, CONFIGURATION INFORMATION MANAGEMENT PROGRAM, AND CONFIGURATION INFORMATION MANAGEMENT METHOD

(75) Inventors: Yasuhide Matsumoto, Kawasaki (JP); Yukihiro Watanabe, Kawasaki (JP); Kuniaki Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 549 days.

(21) Appl. No.: 12/414,652

(22) Filed: Mar. 30, 2009

(65) Prior Publication Data

US 2009/0248596 A1 Oct. 1, 2009

(30) Foreign Application Priority Data

Mar. 31, 2008 (JP) .................................. 2008-088965

(51) Int. Cl.
*G06F 17/30* (2006.01)
(52) U.S. Cl. .......................... 707/791; 707/960; 707/749
(58) Field of Classification Search .................. 707/1, 8, 707/100, 2, 711, 608, 695, 960, 795, 798; 717/105, 102, 121, 168
See application file for complete search history.

(56) References Cited

U.S. PATENT DOCUMENTS

| | | | |
|---|---|---|---|
| 6,330,572 B1 * | 12/2001 | Sitka | 707/608 |
| 6,366,954 B1 * | 4/2002 | Traversat et al. | 709/220 |
| 6,421,719 B1 * | 7/2002 | Lewis et al. | 709/224 |
| 6,973,466 B2 * | 12/2005 | Kaler et al. | 707/695 |
| 7,080,073 B1 * | 7/2006 | Jiang et al. | 1/1 |
| 7,526,479 B2 * | 4/2009 | Zenz | 1/1 |
| 7,590,669 B2 * | 9/2009 | Yip et al. | 1/1 |
| 7,849,104 B2 * | 12/2010 | Sun et al. | 707/798 |
| 7,873,940 B2 * | 1/2011 | Sanghvi et al. | 717/102 |
| 7,926,031 B2 * | 4/2011 | Faihe et al. | 717/121 |
| 7,971,231 B2 * | 6/2011 | Gupta et al. | 726/1 |
| 8,046,393 B2 * | 10/2011 | Lang | 707/795 |
| 2005/0114851 A1 * | 5/2005 | Watson-Luke et al. | 717/168 |
| 2006/0225032 A1 * | 10/2006 | Klerk et al. | 717/105 |
| 2008/0243766 A1 * | 10/2008 | Nowlan et al. | 707/2 |
| 2008/0301124 A1 * | 12/2008 | Alves et al. | 707/5 |
| 2010/0057843 A1 * | 3/2010 | Landsman et al. | 709/203 |
| 2010/0076955 A1 * | 3/2010 | Van Steenbergen et al. | 707/711 |

FOREIGN PATENT DOCUMENTS

| | | |
|---|---|---|
| JP | 08-147166 A | 6/1996 |
| JP | 2007-241774 A | 9/2007 |
| JP | 2007-316853 A | 12/2007 |

* cited by examiner

*Primary Examiner* — James Trujillo
*Assistant Examiner* — Thong Vu
(74) *Attorney, Agent, or Firm* — Fujitsu Patent Center

(57) ABSTRACT

A CMDB (configuration information management database) stores a CI (configuration item) and know-how separately. A CMDB data update management unit associates with each set of "property:value" stored in the CI with related know-how in the CMDB. The know-how stores a set of "property:value" common to a number of associated CIs.

17 Claims, 19 Drawing Sheets

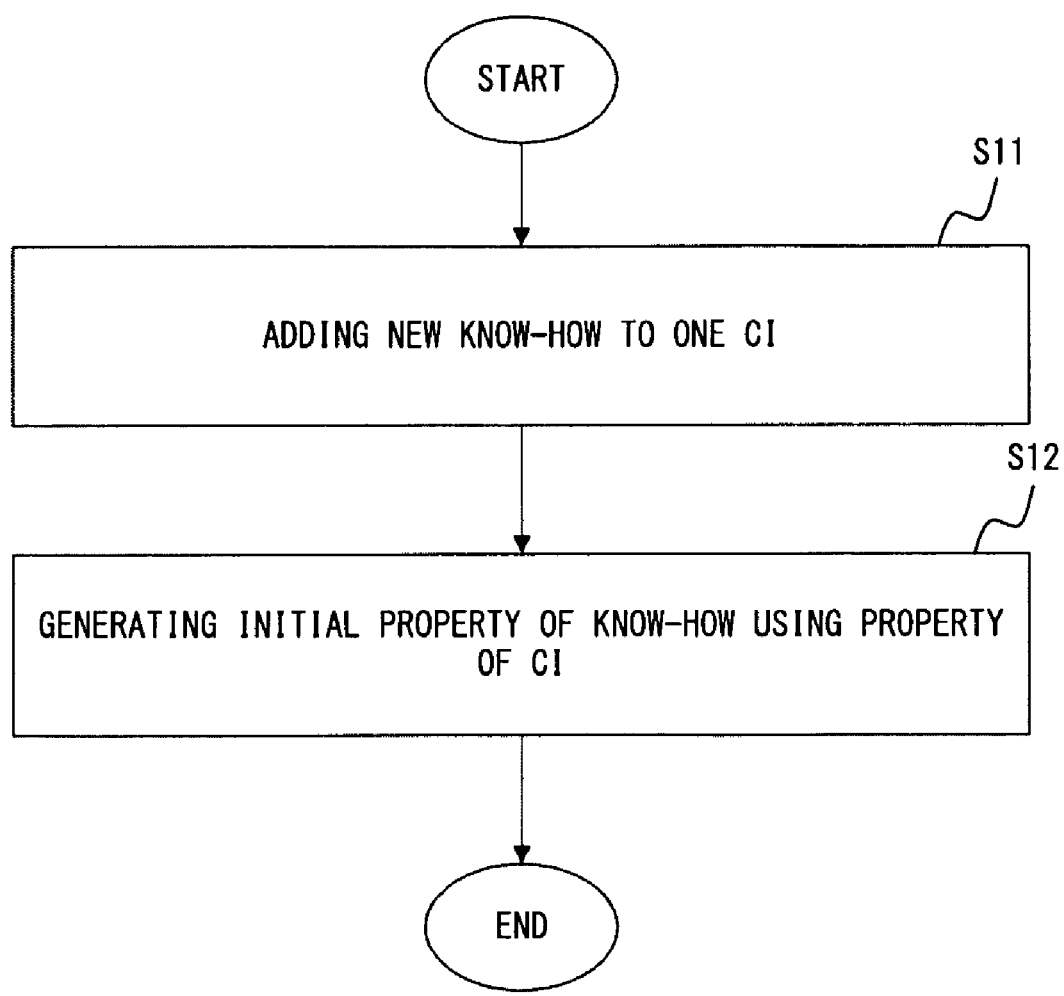
F I G. 9

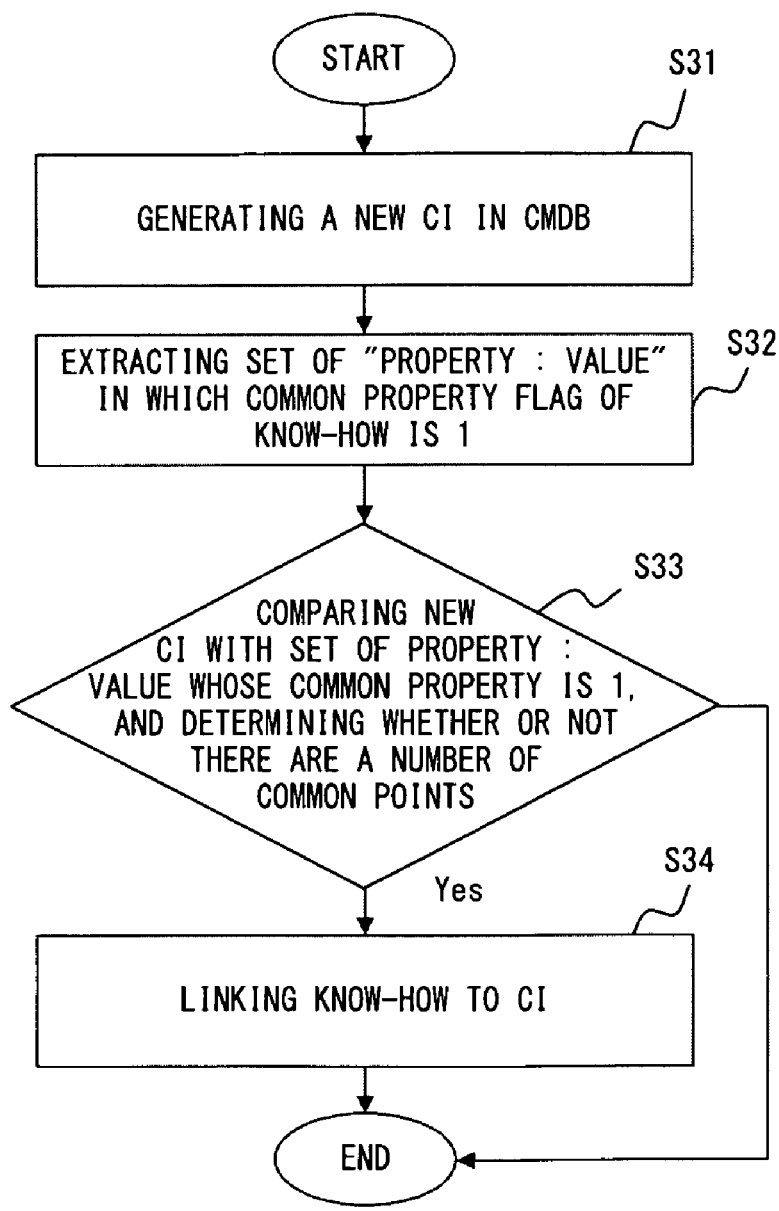
F I G. 1 5

CONFIGURATION INFORMATION MANAGEMENT APPARATUS, CONFIGURATION INFORMATION MANAGEMENT PROGRAM, AND CONFIGURATION INFORMATION MANAGEMENT METHOD

BACKGROUND OF THE INVENTION

1. Field of the Invention

The present invention relates to a configuration information management apparatus, a configuration information management program, and a configuration information management method for managing the configuration items of an IT (information technology) system.

2. Description of the Related Art

In the IT service field, the ITIL (Information Technology Infrastructure Library) has become a common international operating management standard. The ITIL is an international standard specification about the operation management of IT services, and aims at improving the quality of IT services, reducing a necessary cost for an IT system from intermediate- and long-term points of view, etc. A CMDB (configuration management database) is a database for management of configuration items of an IT system, and a component as a kernel of the ITIL. The establishment of the integrated structure of data has been required in automating the operation of an IT system and producing a model of a business process while a corporation is observing various laws and regulations. To attain the objective, the CMDB is important as a kernel of necessary components.

The CMDB supports understanding the relationship among the configuration items of an IT system to manage the system configuration. In the CMDB, a configuration item is referred to as a CI, the CI and the details of its property are managed, and the relationship among the CIs are managed. A CI practically refers to resources such as hardware, software, etc. configuring an IT system. For example, the hardware can be a server, a storage device, a switch, etc., and the software can be an OS (operating system), application software, etc.

A CI manages a component as a set of a "property" and a "property:value". The property of the CI can be "equipment", a "role", etc. and additionally "model number of entire equipment" (for example, the model number of a server in case of a server), "CPU model number" (model number of the CPU provided for a server), "model number of a network card", "software installed into a server, a client terminal, etc.", "a port number used for network related software", etc. Thus, the property of the CI corresponds to "all setting information about software/hardware" relating to the equipment.

A case database in which a pair of a property having a different value depending on a case and the value of the property (property value) is stored is known as a technique relating to the present invention (for example, Japanese Unexamined Patent Application No. H8-147166 of Japanese Patent Office).

At present, relating to a CMDB, there is a request to record detailed know-how for each CI as a management unit. However, detailed know-how is registered at random for each CI, and the know-how is not shared at present because the know-how is recorded for each CI on each site. For example, in the case of a PROXY server, although there is the know-how specific to the PROXY server, the know-how is registered for the specific CI only, and is not realized to be shared.

FIG. 1 shows the concept of an example in which know-how is not shared.

In FIG. 1, the following three CIs 1001 through 1003 are shown.

CI 1001 (equipment: PRIMERGY BX 620 S4, role: PROXY server)

CI 1002 (equipment: PRIMERGY BX 620 S4, role: file server)

CI 1003 (equipment: PRIMERGY BX 100 S4, role: PROXY server)

Here "equipment" and "role" are properties, and the product name such as "PRIMERGY BX 620 S4" etc. and the role of the server such as "file server" etc. are properties. Hereinafter, the property value is referred to as "value" for convenience. Therefore, two sets of "property:value" are registered in each of the CI 1001 through 1003. Additionally, the CI 1001 stores know-how 2001 and 2004, and the CI 1002 stores know-how 2002. The CI 1003 stores know-how 2004.

Describing know-how for a set of "property:value" stored in a CI can be considered as a method for solving the above-mentioned situation. However, the conventional CMDB has no data structure for realizing the above-mentioned description of know-how. FIG. 2 shows the data structure of the conventional CMDB.

As shown in FIG. 2, the current CMDB stores in one CI a plurality of sets of "property:value" (in this example, "property 1: value 1", "property 2: value 2", . . . , and "equipment: PRIMERGY BX 620 S4"), and the know-how about any set of "property:value" stored in the CI is stored in the format similar to that of the property without linking to the set of "property:value". Therefore, the current CMDB cannot associate the set of "property:value" with know-how in advance. That is, know-how can be stored in the CI, but it cannot be stored with a related property specified in advance.

In addition, the current IT system can include the know-how about a plurality of sets of "property:value", but the conventional CMDB cannot associate common know-how with the plurality of sets of "property:value". For example, the know-how that "the server as "PRIMERGY" and a "PROXY server" is provided with the know-how" cannot be stored in the conventional CMDB.

SUMMARY OF THE INVENTION

The present invention aims at providing a configuration information management database capable of sharing a plurality of configuration items relating to a piece of know-how.

The configuration information management apparatus according to the present invention is to be a configuration information management apparatus for integrally managing the configuration item of an information system and its property information.

An aspect of the configuration information management apparatus of the present invention includes: a configuration information management database storing a configuration item of an information system having a set of "property: value", and know-how relating to each set of "property:value" of the configuration item; and a management device storing the configuration item associated with the know-how relating to the configuration item in the configuration information management database on the basis of the set of "property:value" of the configuration item.

According to another aspect of the configuration information management apparatus of the present invention includes: a configuration information management database storing property information about a configuration item of an information system and the know-how related to each set of "property:value" of the configuration item with each "property: value" of the configuration item associated with related know-how; a similarity determination device for determining the similarity of a stored set of "property:value" for a configuration item stored in the configuration information management database; and a property management device for associating configuration items having similarity higher than a predetermined threshold with the same know-how on the basis of the determination result of the similarity determination device.

According to the present invention, the know-how related to a configuration item is associated with the configuration item and stored in the configuration information management database on the basis of a set of "property:value" of the configuration item. Therefore, the know-how can be shared among a plurality of configuration items. Additionally, a configuration information management database that allows know-how to be shared among a plurality of configuration items relating to the know-how can be presented.

BRIEF DESCRIPTION OF THE DRAWINGS

FIG. 9 is a flowchart of the process algorithm of the method for setting a predetermined value of a set of "property:value" according to the know-how shown in FIG. 8;

FIG. 15 is a flowchart for explanation of the process algorithm of the CMDB data update management unit for realizing the operation when a new CI shown in FIG. 13 is added to the CMDB;

DETAILED DESCRIPTION OF THE PREFERRED EMBODIMENT

The embodiments of the present invention are described below with reference to the attached drawings.

Principle of the Embodiments of the Present Invention

Figure 1:
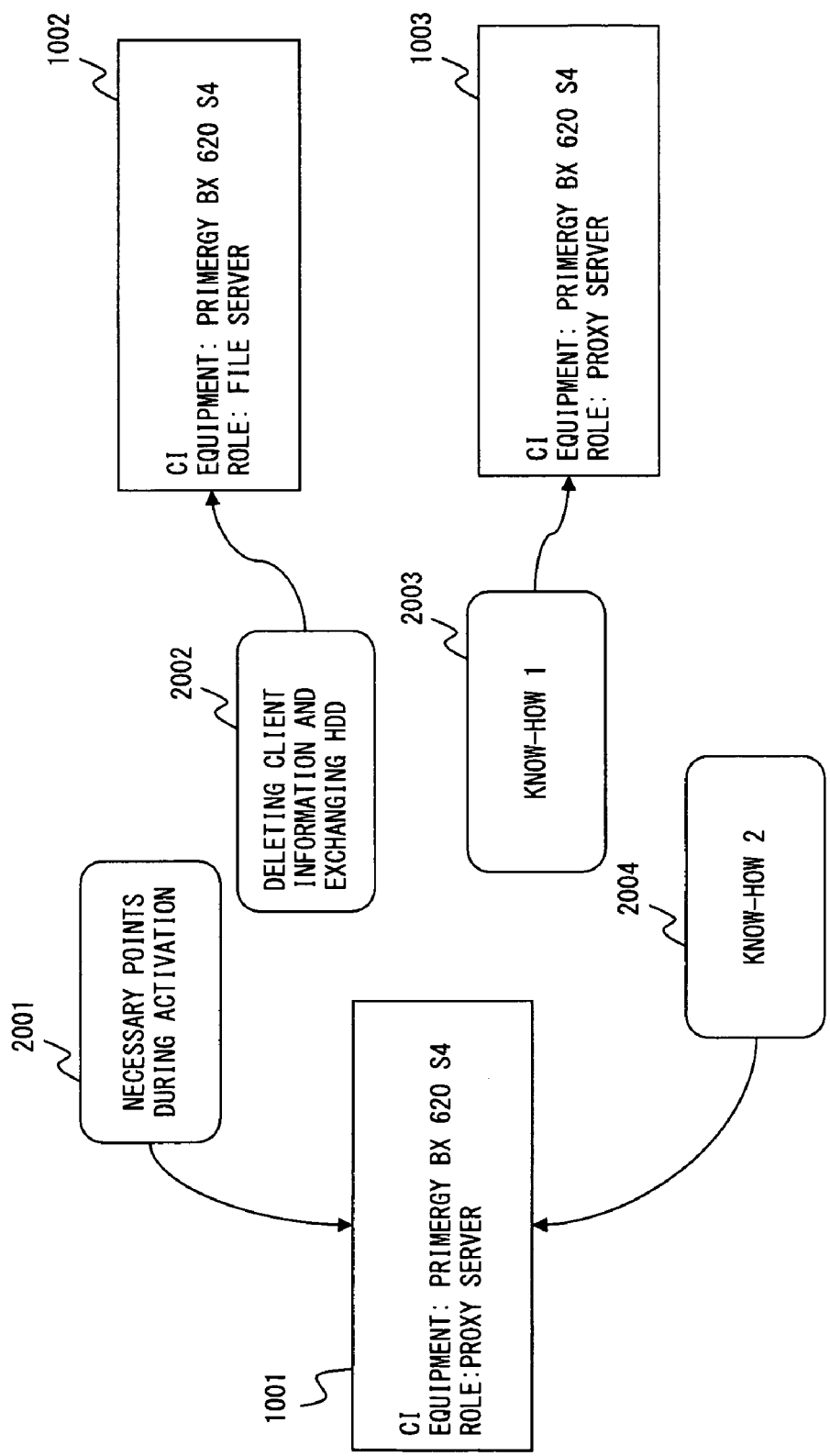
FIG. 1 shows the concept of an example in which know-how is not shared.
Figure 2:
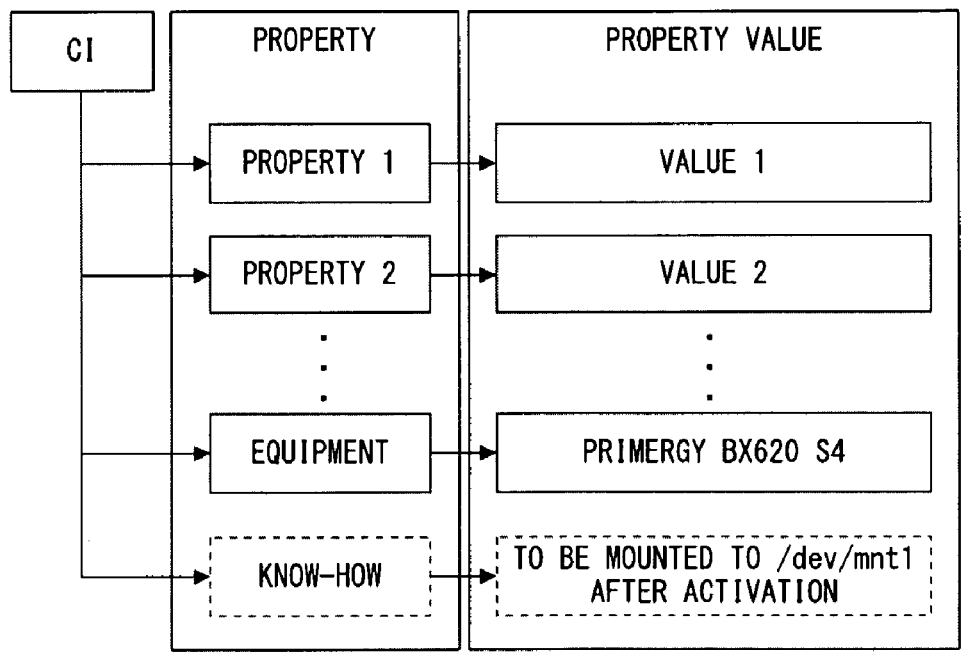
FIG. 2 shows the data structure of the conventional CMDB.
Figure 3:
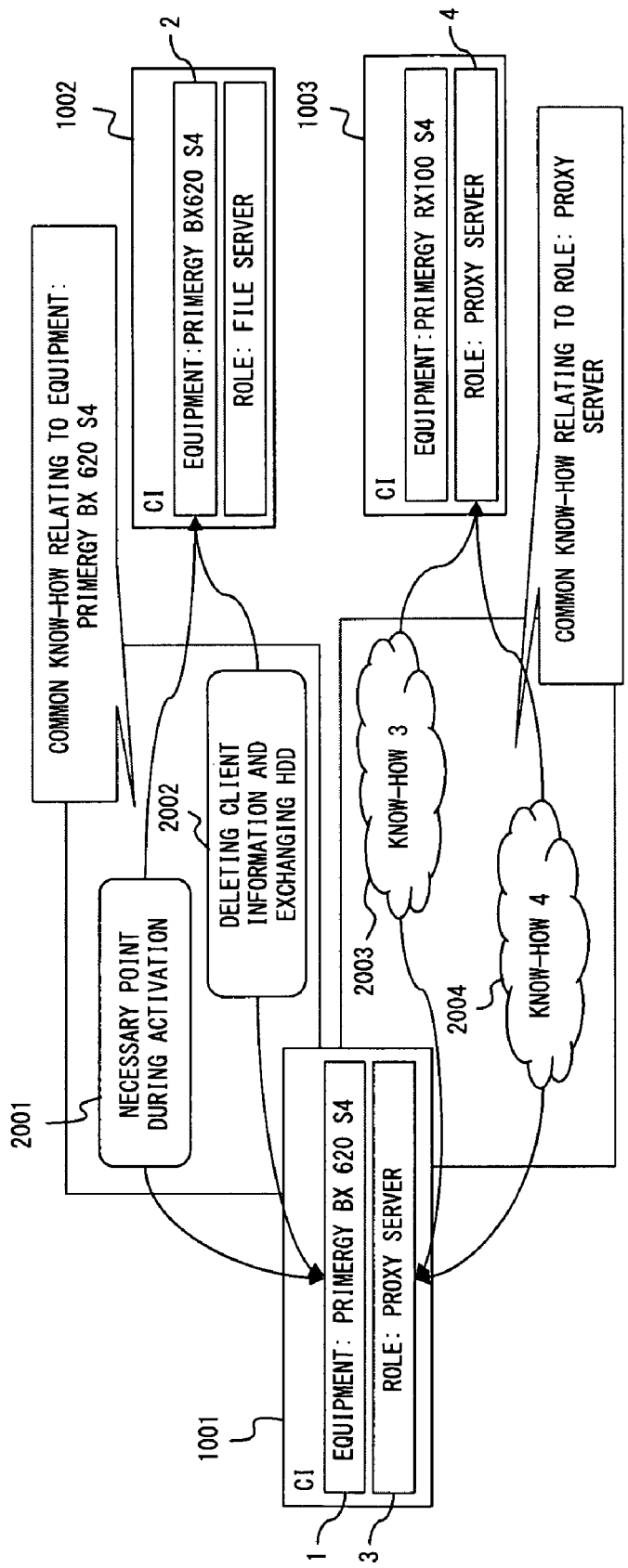
FIG. 3 shows the concept of describing know-how for a set of "property:value" stored in the CI through the CMDB according to an embodiment of the present invention.

FIG. 3 shows the concept of describing know-how for a set of "property:value" stored in the CI through the CMDB according to an embodiment of the present invention. A configuration item shown in FIG. 3 and the same configuration item shown in FIG. 1 are assigned the same reference numerals.

In the CMDB according to the present embodiment, the same sets of "property:value" are associated with know-how as shown in FIG. 3. With the configuration, the know-how for a certain set of "property:value" can be shared. That is, the common know-how 2001 and 2002 relating to the set of "equipment: PRIMERGY BX 620 S4" are associated with the sets 1 and 2 of "equipment: PRIMERGY BX 620 S4" in the CIs 1001 and 1002. Similarly, the common know-how 2002 is associated with the sets 1 and 2 of "equipment: PRIMERGY BX 620 S4" in the CIs 1001 and 1002. The common know-how 2003 and 2004 relating to the sets of "role: PROXY server" are associated with the sets 3 and 4 of the "role: PROXY server" in the CIs 1001 and 1003. The present embodiment automatically associates the same know-how with the same sets of "property:value". Thus, the know-how relating to the hardware resources having the same equipment and the same role can be shared by the CMDB.

[Configuration]

Figure 4:
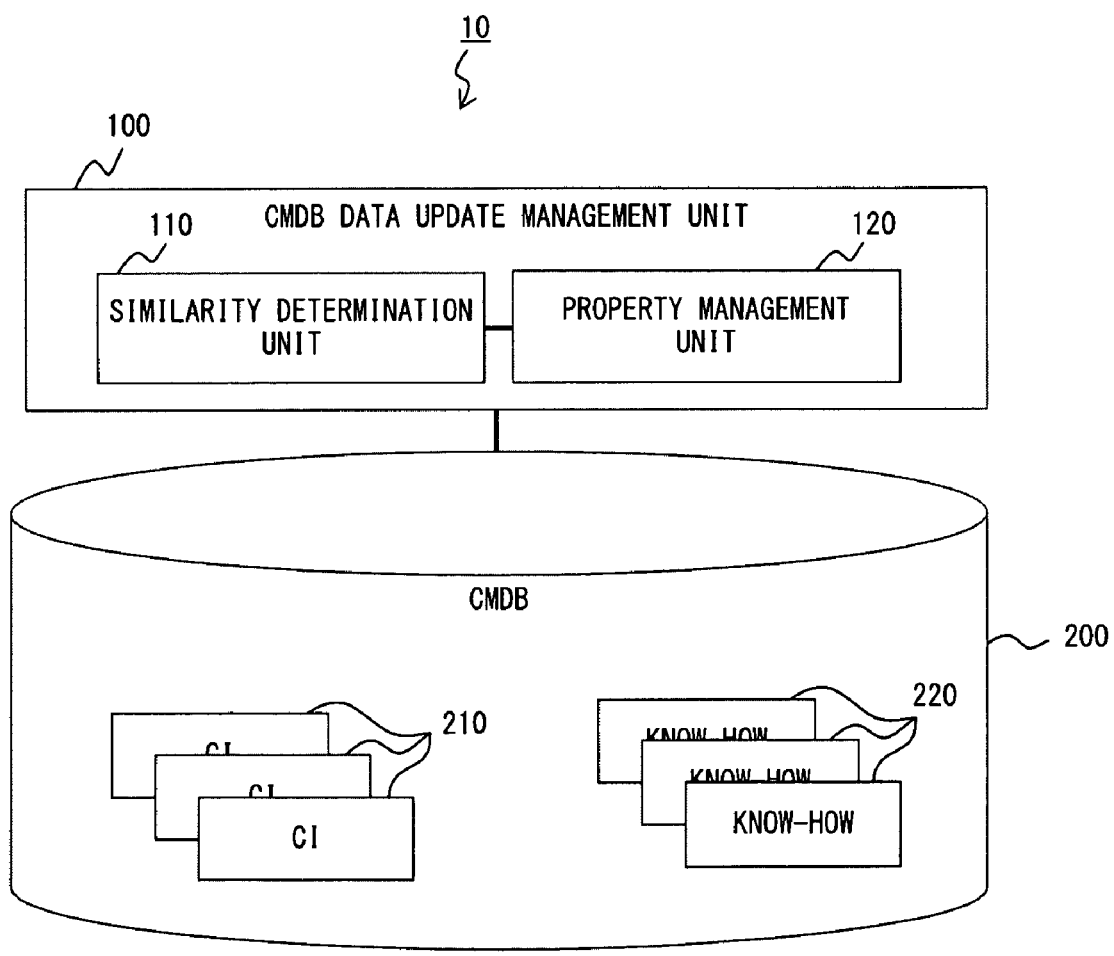
FIG. 4 is a block diagram showing the system configuration of the configuration information management apparatus according to an embodiment of the present invention.

FIG. 4 is a block diagram showing the system configuration of the configuration information management apparatus according to an embodiment of the present invention.

A configuration information management apparatus 10 shown in FIG. 4 is provided with a CMDB data update management unit 100 and a CMDB 200. The CMDB data update management unit 100 has the function of updating and managing data stored in the CMDB 200, and is provided with a similarity determination unit 110 and a property management unit 120. The CMDB 200 is a database for storage and management of one or more CIs 210 and one or more pieces of know-how 220. The CMDB 200 according to the present embodiment manages the CI 210 and the know-how 220 separately. Described below is the data structure of the CMDB 200.

Figure 5:
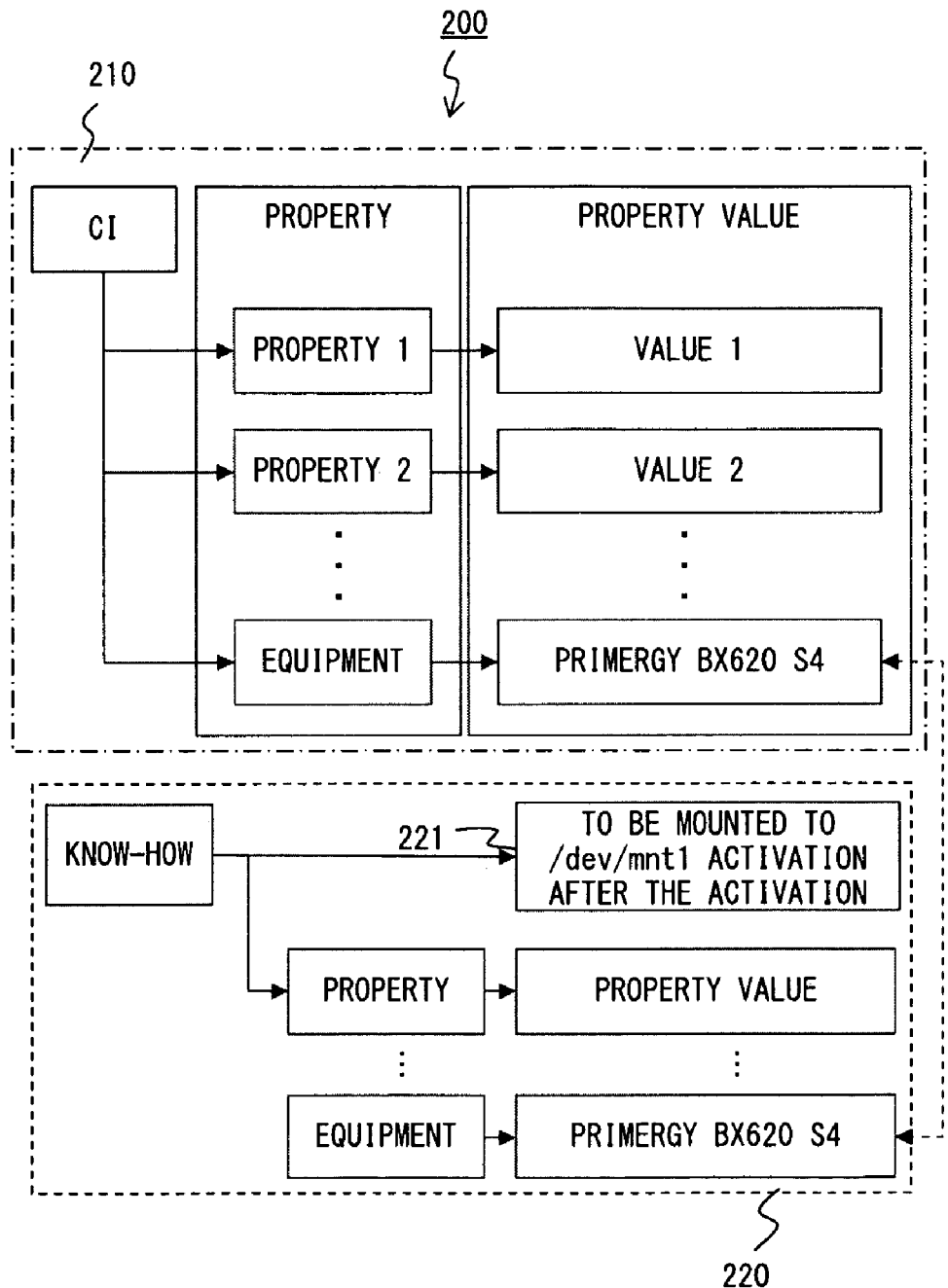
FIG. 5 shows the data structure of the CMDB according to an embodiment of the present invention.

FIG. 5 shows the data structure of the CMDB 200 according to the present embodiment. The know-how 220 shown in FIG. 5 has a part of the data structure omitted.

As shown in FIG. 5, the CMDB 200 stores the CI 210 and the know-how 220 separately. The CI 210 stores one or more sets of "property:value". In the example shown in FIG. 5, the CI 210 stores a set of "property 1 and value 1", a set of "property 2 and value 2", and a set of "equipment: PRIMERGY BX 620 S4". The know-how 220 stores know-how information 221 and one or more sets of "property:value". The know-how 220 relates to any set of "property:value" in the know-how 220. In the example shown in FIG. 5, the know-how 220 is linked to the set of "equipment: PRIM- ERGY BX 620 S4" in the CI 210. The link shows that the know-how information 221 ("to be mounted to /dev/mnt1 after the activation") stored in the know-how 220 relates to the set of "equipment: PRIMERGY BX 620 S4".

As described above, the CMDB data update management unit 100 is provided with the similarity determination unit 110 and the property management unit 120. When a new CI is added to the CMDB 200, the similarity determination unit 110 determines the similarity between the CI and the know-how stored in the CMDB 200. The property management unit 120 manages the property of the know-how 220, and updates the set of "property:value" of the know-how 220. The update is performed on the basis of the determination result of the similarity by the similarity determination unit 110.

{Data Structure of Know-How}

Figure 6A:
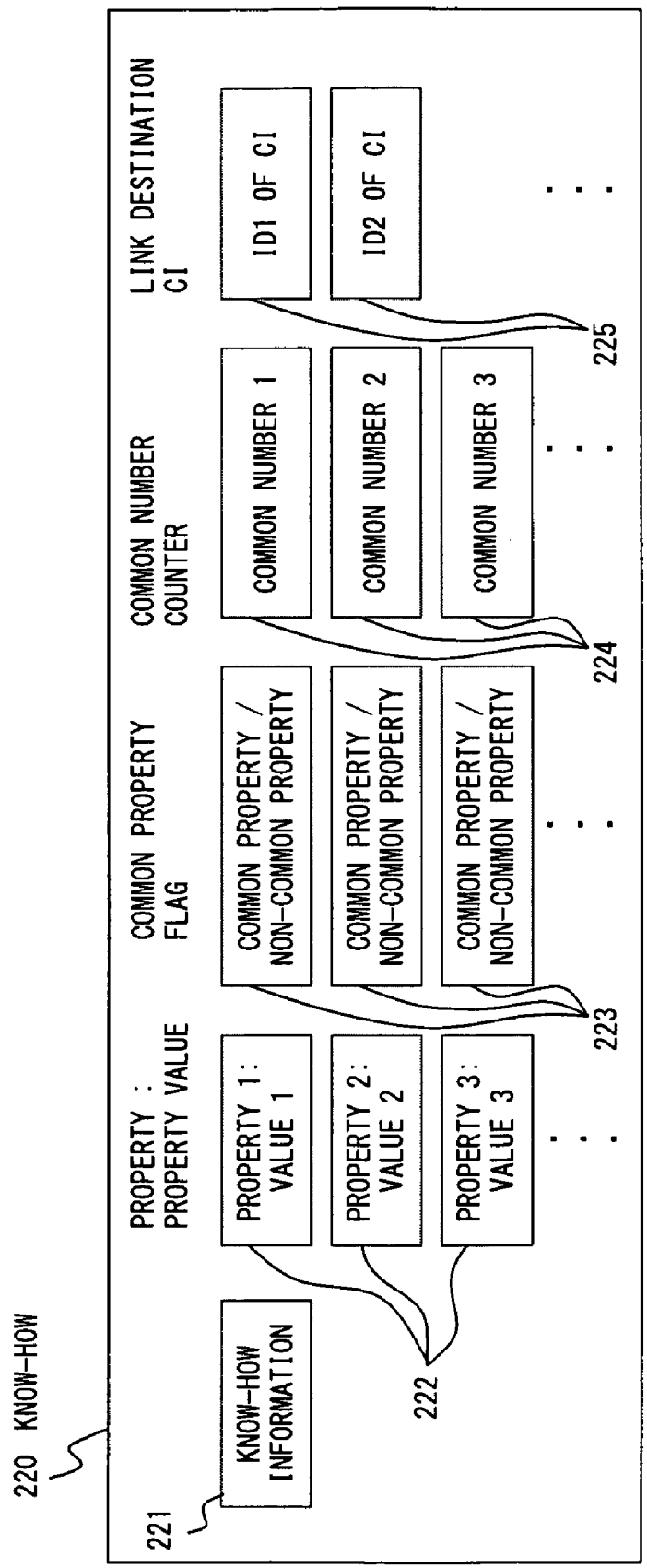
FIG. 6A shows the data structure of the know-how according to an embodiment of the present invention.

FIG. 6A shows the data structure of the know-how 220 according to the present embodiment.

As shown in FIG. 6A, the know-how 220 has a piece of the know-how information 221, and one or more sets of "property:value" 222. It also has a "common property flag 223" and a "common number counter 224" provided corresponding to each set of "property:value" 222. In addition, the know-how 220 has link destination CI information 225 for association with (link to) the related CI 210.

The know-how information 221 describes the know-how for the system management about a set of "property:value" 211 in the CI 210. The common property flag 223 indicates whether or not the common property flag 223 refers to the know-how (shared know-how) common among the sets of "property:value" 211 of a plurality of CIs 210. When the sets of "property:value" 211 having the same know-how information 221 are detected in a number of CIs 210, the common property flag 223 indicates a "common property". When they are not detected in a number of CIs 210, it indicates a "non-common property". The set of "property:value" 222 is stored as a set of "property:value" specific to the know-how information 221 in the know-how 220 by the corresponding common property flag 223 set as a "common property".

The common number counter 224 is a count value for determining whether or not the set of "property:value" 222 that was not stored in the past is to be stored when the new CI 210 is added to the CMDB 200, equals the number of CIs 210 having the same know-how information 221 and the same set of "property:value" 222 (in this case, the set of "property:value" 222=the set of "property:value" 211), that is, equals the number of CIs 210 having the same know-how information 221. The link destination CI information 225 is an identifier (ID) for linking the know-how 220 to the CI 210. In the present embodiment, the know-how 220 is associated with the CI 210 by assigning an individual identifier (hereinafter referred to as an ID) to each CI 210. The link destination CI information 225 corresponds to the property "ID" in a so-called relational model. The ID of one CI 210 to be linked to the know-how 220 is set in a piece of link destination CI information 225. Therefore, the know-how 220 stores the link destination CI information 225 of the number equal to the number of the linked CIs 210.

Figure 6B:
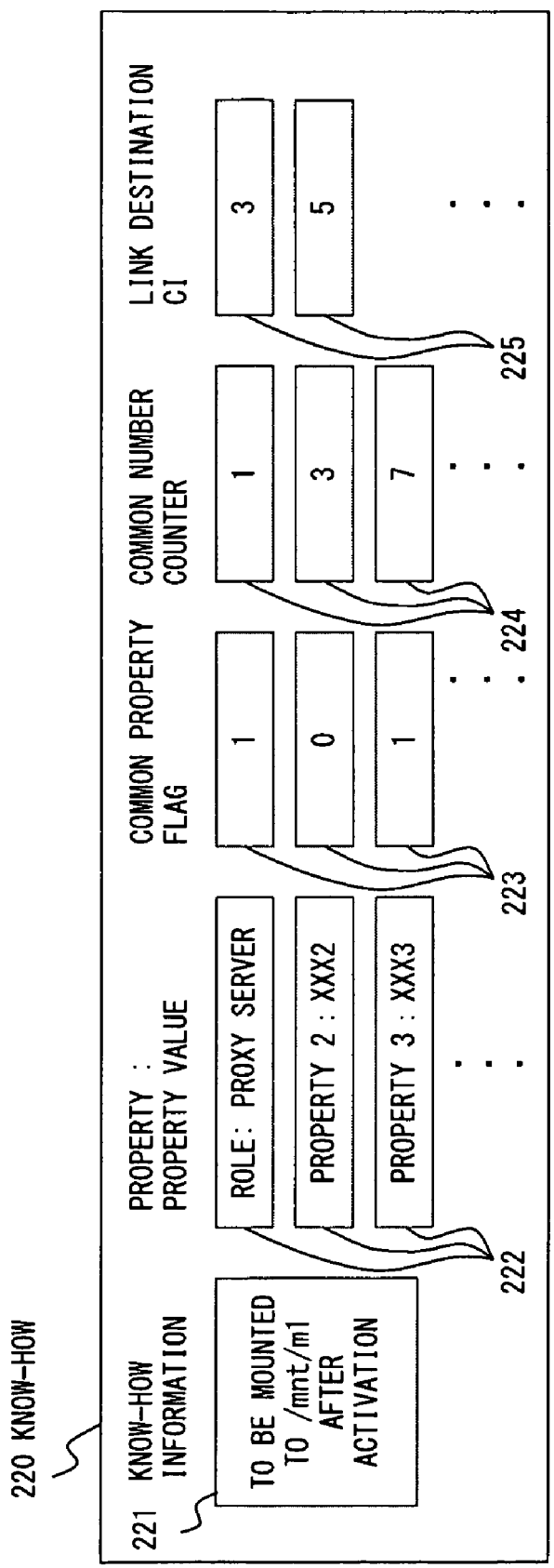
FIG. 6B shows a practical example of the know-how according to an embodiment of the present invention.

FIG. 6B shows a practical example of the know-how 220 according to the present embodiment. In the know-how 220 shown in FIG. 6B, it is necessary to mount the know-how information 221 to /mnt/m1 after activation. The "role: PROXY server" is specified as the highest set of "property:value" 222, the common property flag 223 is set to "1", and the value of the common number counter 224 is set to 1. The sets of "property:value" 222 in the second and third rows have respectively "property 2: XXX 2" and "property 3: value 3", and the values of the common property flag 223 and the common number counter 224 are respectively set. In the case of the common property flag 223 in this example, "1" indicates "common property", and "0" indicates "non-common property". The know-how 220 stores two pieces of link destination CI information 225 whose IDs are set to "3" and "5" respectively, and the two CIs 210 respectively having the IDs "3" and "5" are linked to the know-how 220.

{Method of Associating Know-How to a CI}

Figure 7:
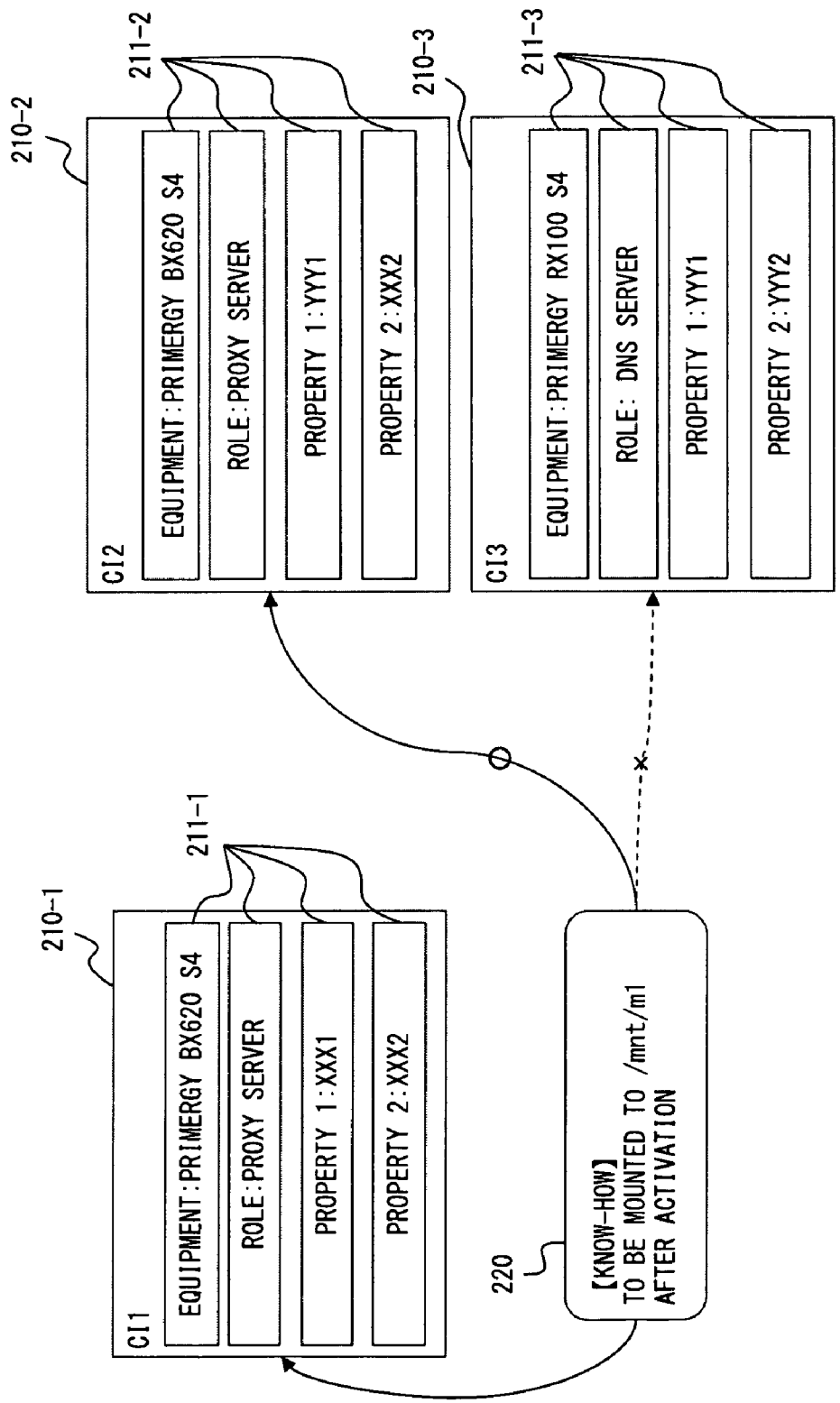
FIG. 7 shows the concept of the method for associating know-how with a set of "property:value" according to an embodiment of the present invention.

FIG. 7 shows the concept of the method for associating know-how with a set of "property:value" according to the present embodiment. In FIG. 7, a part of the data structure of the know-how 220 is omitted due to the restrictions on the size of the drawings. The same holds true with FIGS. 10, 13, and 16.

As shown in FIG. 7, assume that there are three CIs 210-1, 210-2, and 210-3, and the CI 210-1 is associated with the know-how 220. In this case, relating to the CI 210-2 and the CI 210-3, all "property:value" sets 211-2 and 211-3 stored in the CIs are compared and checked with all sets of "property:value" 211-1 stored in the CI 210-1, and the similarity among the sets of "property:value" are determined. The determination is performed by the similarity determination unit 110 of the CMDB data update management unit 100. In this example, the similarity between the sets of "property:value" 211 of the CI 210-1 and the CI 210-2 is 75% (=3/4), and the similarity between the CI 210-1 and the CI 210-3 is 0%. Therefore, the know-how 220 is associated with the CI 210-2, but is not associated with the CI 210-3 in this case. The association is performed by the property management unit 120 of the CMDB data update management unit 100 on the basis of the determination result of the similarity determination unit 110.

[Operation]

The operation of the configuration information management apparatus 10 with the above-mentioned configuration is described below with reference to the procedure. For comprehensibility, a piece of know-how 220 stored in the CMDB 200 is exemplified in the following explanation, but the following procedures (I) through (IV) are performed on all know-how 220 stored in the CMDB 200.

Setting a predetermined value of a set of "property:value" of know-how.

Figure 8:
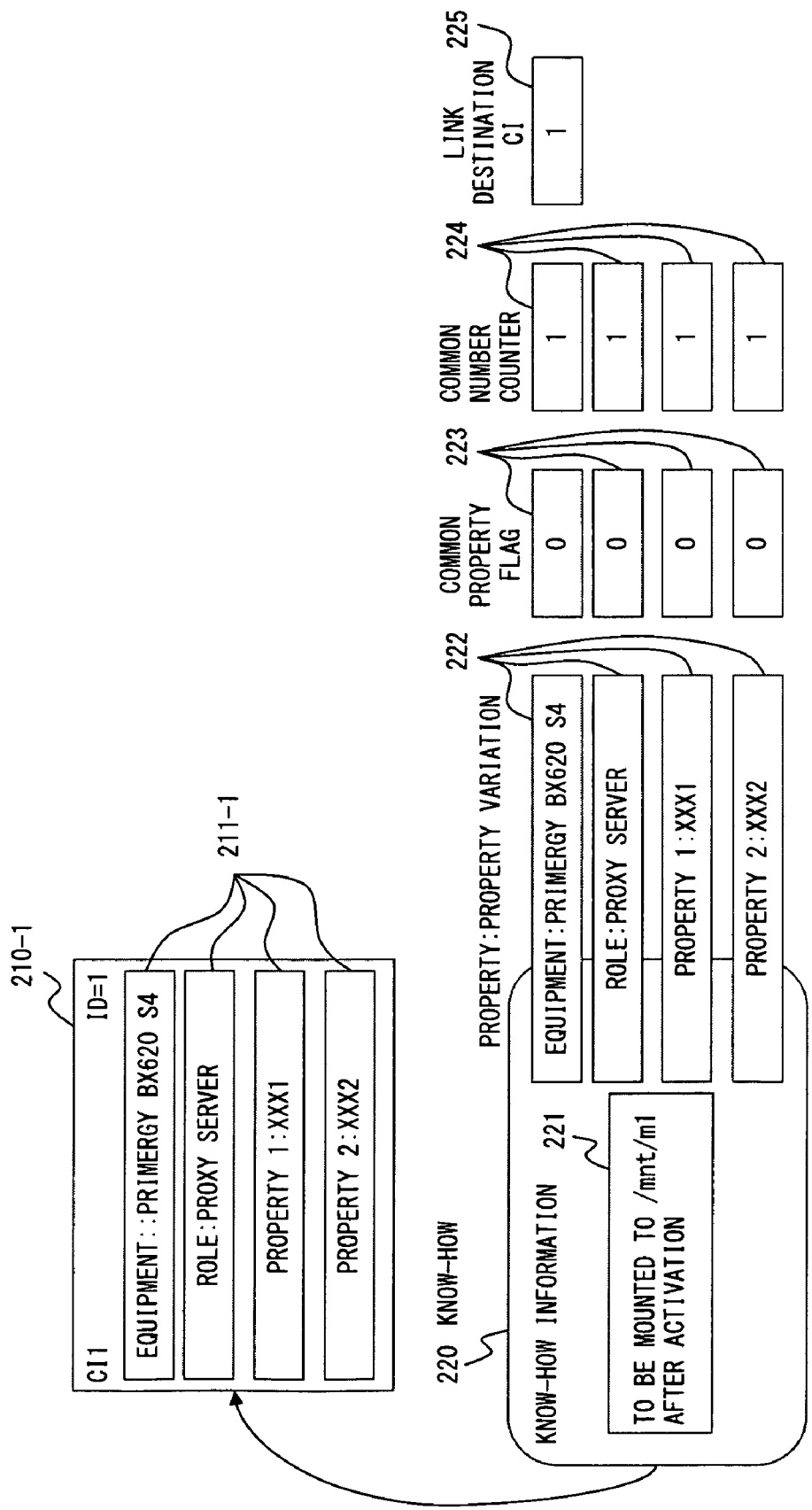
FIG. 8 is a schematic diagram showing the method for setting a predetermined value of a set of "property:value" of the know-how according to an embodiment of the present invention.

FIG. 8 is a schematic diagram showing the method for setting a predetermined value of a set of "property:value" of know-how.

First, the know-how 220 is manually associated with the CI 210 in the CMDB 200. In the example shown in FIG. 8, the know-how 220 is manually associated with the CI 210-1 (ID=1). At this time, the common property flag 223, the common number counter 224, and the link destination CI information 225 corresponding to each set of "property:value" 222 of the know-how 220 are set to predetermined values. In this case, all common property flags 223 and common number counters 224 corresponding to each set of "property:value" 222 of the know-how 220 indicate the same values (information). Practically, the common property flag 223 indicates "0", and the common number counter 224 indicates "1". The link destination CI information 225 indicates "1" expressing the ID of the CI 210-1.

FIG. 9 is a flowchart of the process algorithm of the method for setting a predetermined value of a set of "property:value" according to the know-how shown in FIG. 8. The process shown by the flowchart is executed by the property management unit 120 of the CMDB data update management unit 100.

New know-how 220 is added to one CI 210 (step S11).

The added operation is performed in the CMDB 200.

By the process in step S11, a new piece of know-how 220 is associated with one CI 210 in the CMDB 200. At this time point, the know-how 220 is provided with only the know-how information 221, and includes no other information.

Next, using the set of "property:value" 211 of the CI 210, the set of "property:value" 211 is generated as a predetermined value of the set of "property:value" 222 of the know-how (step S12).

By the process in step S12, all sets of "property:value" 211 of the CI 210 are stored in the know-how 220 as the predetermined values of the set of "property:value" 222 of the know-how 220. The common property flag 223, the common number counter 224, and the link destination CI information 225 of the know-how 220 are also set to predetermined values in the method shown in FIG. 8.

Updating a set of "property:value" of know-how

Next, the property of know-how is updated.

Figure 10:
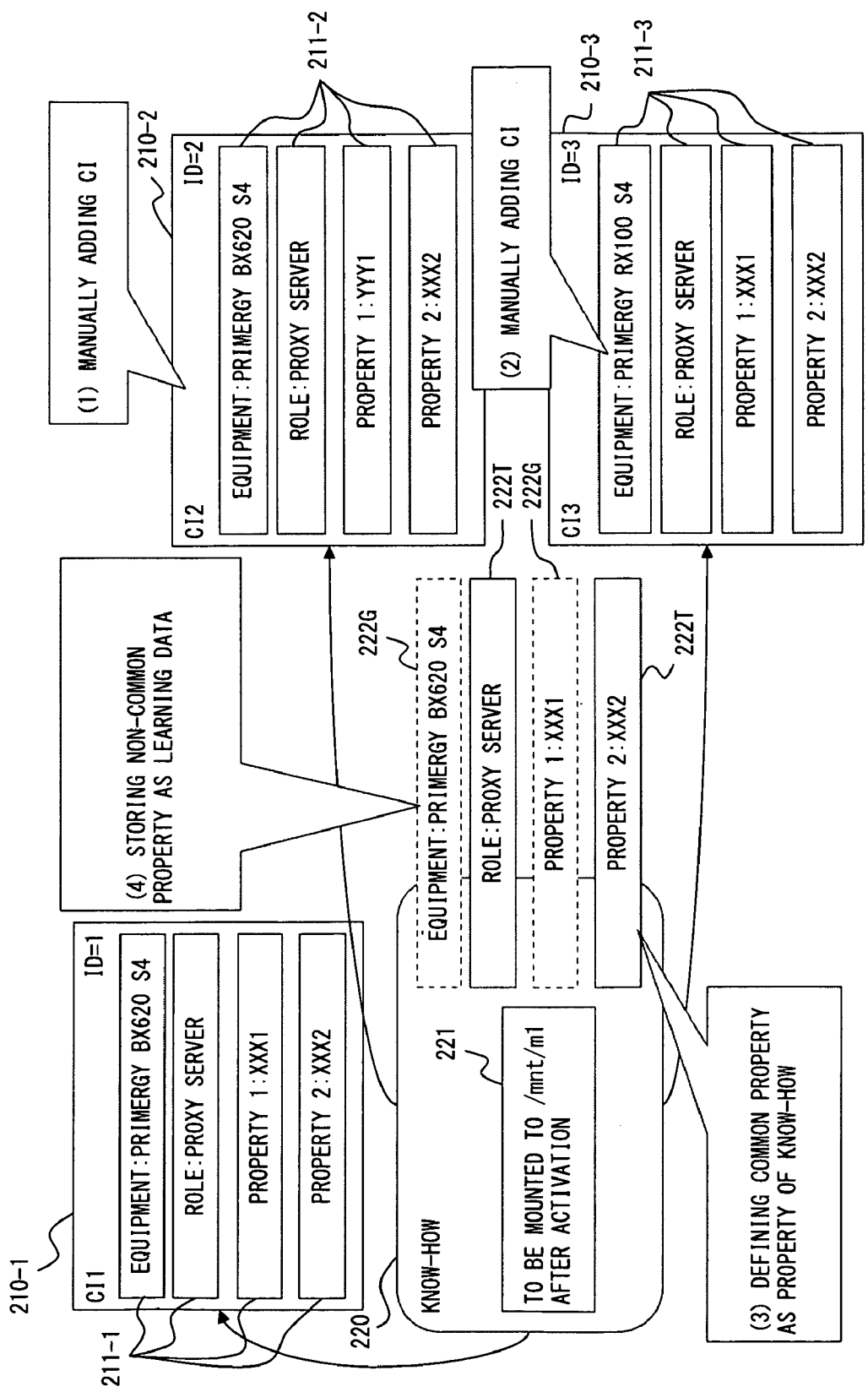
FIG. 10 shows the method for updating the property of know-how.

FIG. 10 shows the method of updating the property of know-how.

First, a CI 210 is added to the know-how 220 of another CI 210. In the example shown in FIG. 10, the CI 210-2 (ID=2) is manually added to the know-how 220 of the CI 210-1 (ID=1).

Then, as in the case of (1) above, a further CI 210 is added to the know-how 220 of the CI 210. In the example shown in FIG. 10, the CI 210-2 (ID=2) is added to the know-how 220 of the CI 210-1.

Next, the set of "property:value" 211 that is common between the CI 210 to which the know-how 220 of the CI 210 is manually added in (1) and (2) above and the CI 210 is defined as the set of "property:value" 222 of the know-how 220.

The set of "property:value" 222 having no common know-how 220 is also stored as "learning data".

Figure 11:
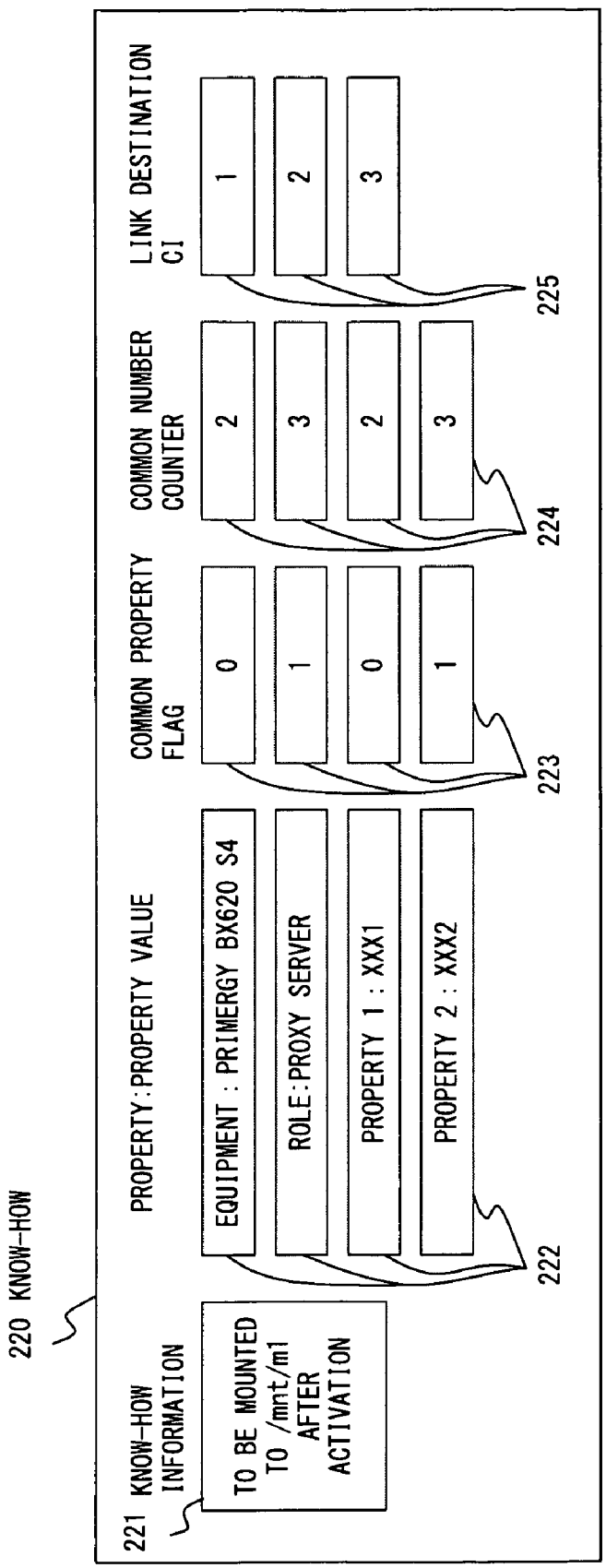
FIG. 11 is a chart showing the contents of the data of the know-how after the property update process of the know-how shown in FIG. 10.

In the example shown in FIG. 10, after the process above, the "role: PROXY server" and the "property 2: XXX 2" are stored as the set of "property:value" 222 in the know-how 220. In addition, the "equipment: PRIMERGY BX 620 S4" and the "property 1: XXX 1" are stored as learning data in the know-how 220. Afterwards, as shown in FIG. 10, the set of "property:value" 222 stored as a set of "property:value" in the know-how 220 is expressed as the set of "property:value" 222T, and the set of "property:value" 222 stored as learning data in the know-how 220 is expressed as the set of "property:value" 222G. In this case, the common property flag 223, the common number counter 224, and the link destination CI information 225 of each set of "property:value" 222 of the know-how 220 are as shown in FIG. 11. That is, "equipment: PRIMERGY BX 620 S4"
common property flag 223: "0"
common number counter 224: 2
"role: PROXY server"
common property flag 223: "1"
common number counter 224: "3"
link destination CI information 225: 1, 2, 3
"property 1: XXX 1"
common property flag 223: "0"
common number counter 224: "2"
"property 2: XXX 2"
common property flag 223: "1"
common number counter 224: "3"
link destination CI information 225: 1, 2, 3

Figure 12:
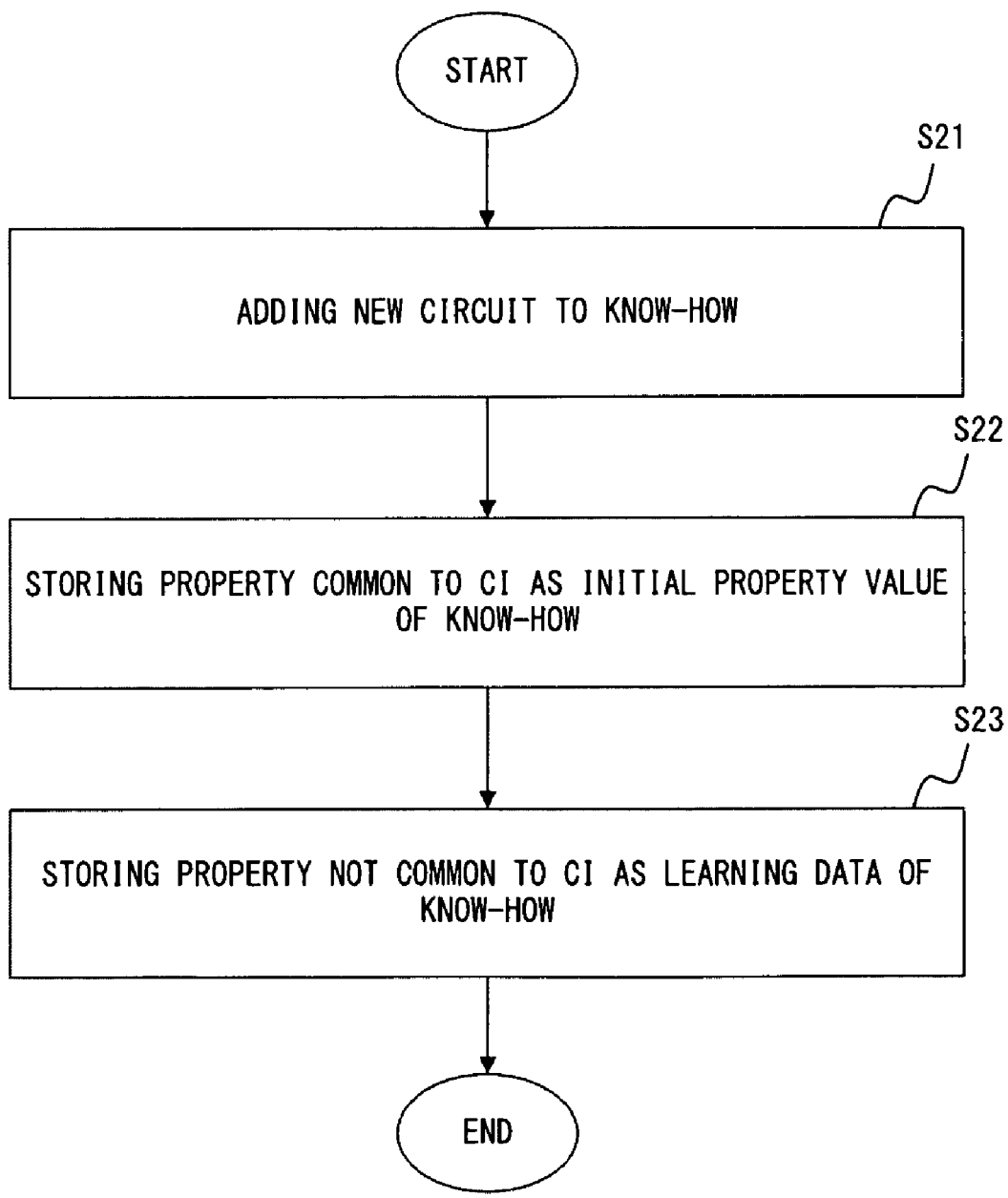
FIG. 12 is a flowchart showing the algorithm of the property update process of the know-how shown in FIG. 10.

FIG. 12 is a flowchart showing the algorithm of the property update process of the know-how shown in FIG. 10. The process in the flowchart is performed by the property management unit 120 of the CMDB data update management unit 100.

First, a new CI 210 is manually added to the know-how 220 (step S21). In this case, the number of added CIs 210 is 1 or more.

Next, the set of "property:value" 211 common among the CI 210 associated with the know-how 220 and the all CIs 210 added to the know-how 220 in step S21 are stored as the initial value of the know-how 220 (step S22).

Finally, the set of "property:value" 211 not common among all CIs 210 is stored as the learning data of the know-how 220 (step S23).

Adding a new CI to CMDB

Figure 13:
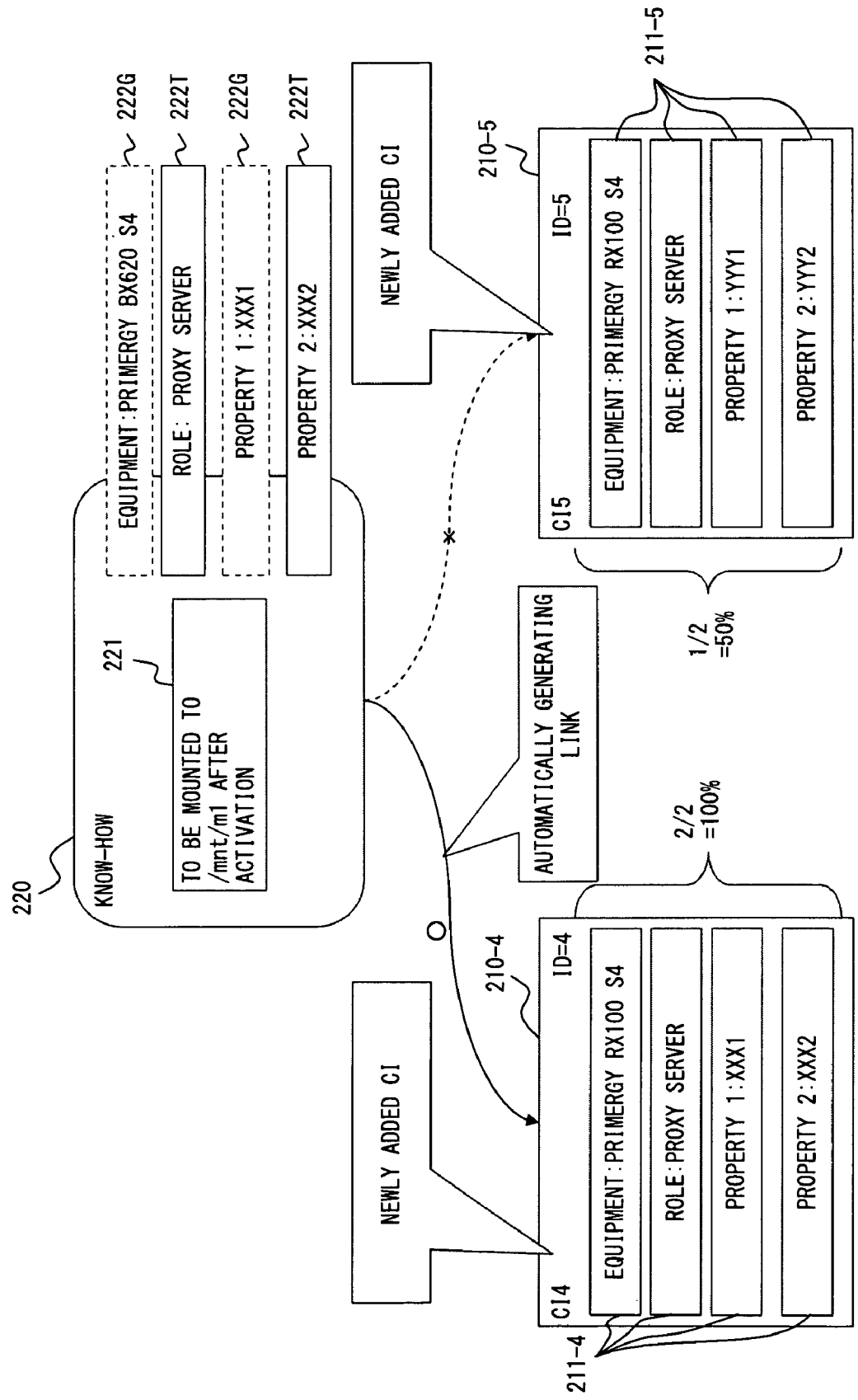
FIG. 13 shows the processing method used when a new CI is added to the CMDB after the procedure of updating a set of "property:value" of know-how is performed.

FIG. 13 shows the processing method used when a new CI 210 is added to the CMDB 200 after the procedure of (II) above is performed.

As described above, when the procedure of (II) above is completed, the know-how 220 stores the "role: PROXY server" and the "property 2: XXX 2" as the set of "property:value" 222T, and the "equipment: PRIMERGY BX 620 S4" and the "property 1: XXX 1" are stored as the learning data 222G.

At this time, as shown in FIG. 13, it is assumed that the CI 210-4 and the CI 210-5 are newly stored in the CMDB 200. In this case, the set of "property:value" 211-4 and 211-5 stored respectively for the CI 210-4 (ID=4) and the 210-5 (ID=5) are compared with the set of "property:value" 222T stored in the know-how 220, and the similarity is determined. When the similarity of the set of "property:value" 211-4 of the CI 210-4 with the set of "property:value" 221T is checked, the CI 210-4 is provided with two sets of "property:value" 221T stored in the know-how 220. Therefore, the similarity is 100% (2/2). Therefore, a link is automatically generated between the know-how 220 and the CI 210-4, and the know-how 220 is set in the know-how of the CI 210-4. Next, when the set of "property:value" 211-5 of the CI 210-5 is similarly checked for the similarity with the set of "property:value" 221T, the similarity is 50% (=½).

Therefore, no link is generated between the CI 210-5 and the know-how 220.

Thus, when a new CI 210 is stored in the CMDB 200, the similarity between the set of "property:value" 221T of the know-how 220 in the CMDB 200 and the set of "property:value" 211 of the newly stored CI 210 is determined. If the similarity is larger than a predetermined threshold, then the CI 210 is associated with the know-how 220. If the similarity is equal to or smaller than the threshold, then the CI 210 is not associated with the know-how 220.

Figure 14:
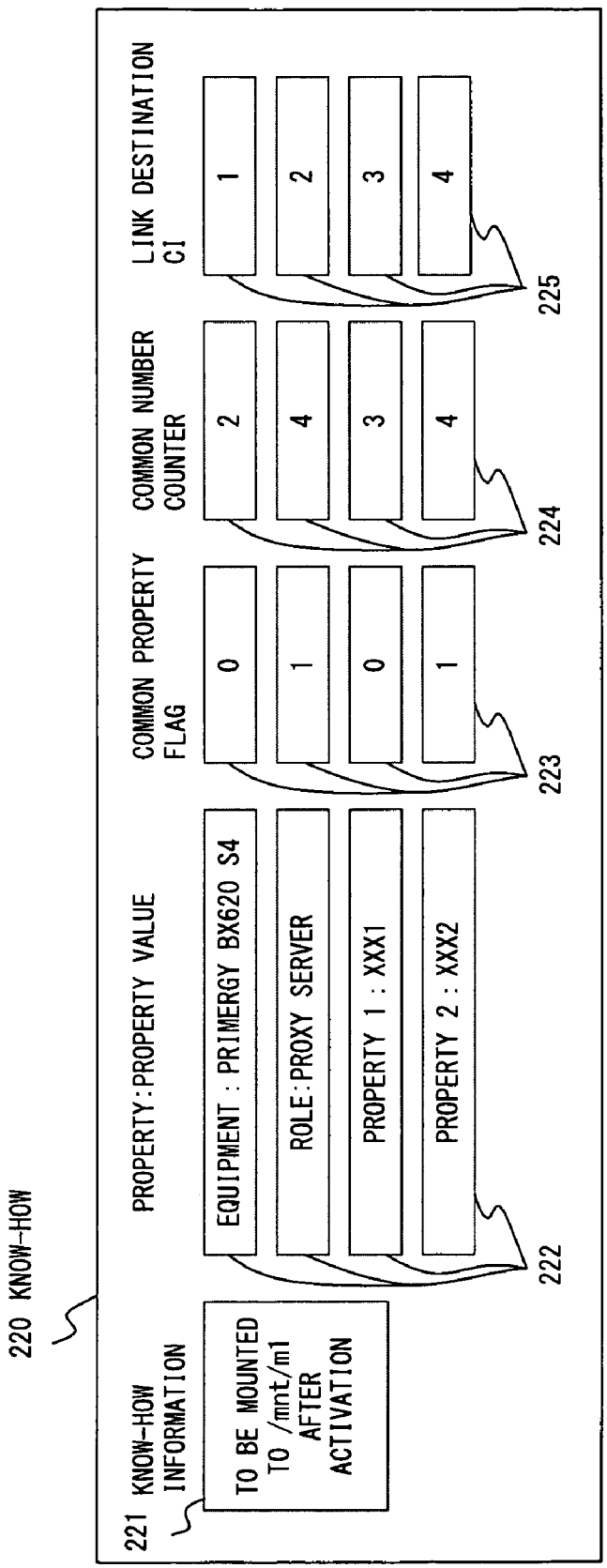
FIG. 14 shows the contents of the data of the know-how after the know-how is newly associated with a CI.

As described above, by newly associating the CI 210-4 with the know-how 220, the data contents of the know-how 220 are changed into the state shown in FIG. 14.

FIG. 15 is a flowchart for explanation of the process algorithm of the CMDB data update management unit 100 for realizing the operation when the new CI 210 shown in FIG. 13 is added to the CMDB 200.

When the new CI 210 is generated in the CMDB 200 (step S31), the similarity determination unit 110 extracts a set in which the common property flag 223 is set to "1" from among the sets of "property:value" 222 (step S32). As described above, the set of "property:value" 222 in which the common property flag 223 is set to "1" is the set of "property:value" 221T stored in the know-how 220.

The similarity determination unit 110 compares the set of "property:value" 211 of the new CI 210 with the set of "property:value" 222 in which the common property flag 223 of the know-how 220 is set to "1", and determine whether or not there are a number of common points among the sets of "property:value" (step S33). In this case, the determination criteria as to whether or not there are a number of common points is made on the basis of, for example, the following expression.

$$\text{number of common sets of "property:value"/number of all sets of "property:value"} > 0.8$$

If the above-mentioned condition is satisfied, it is determined that there are a number of common points.

If the similarity determination unit 110 determines that there are a number of common points (YES in step S33), then it notifies the know-how 220 of the determination result. When the know-how 220 receives the determination result, it links the know-how 220 to the new CI 210 (step S34).

On the other hand, when the similarity determination unit 110 determines that there are not a number of common points in step S33 (NO in step S33), then it terminates the process in the flowchart.

Figure 16:
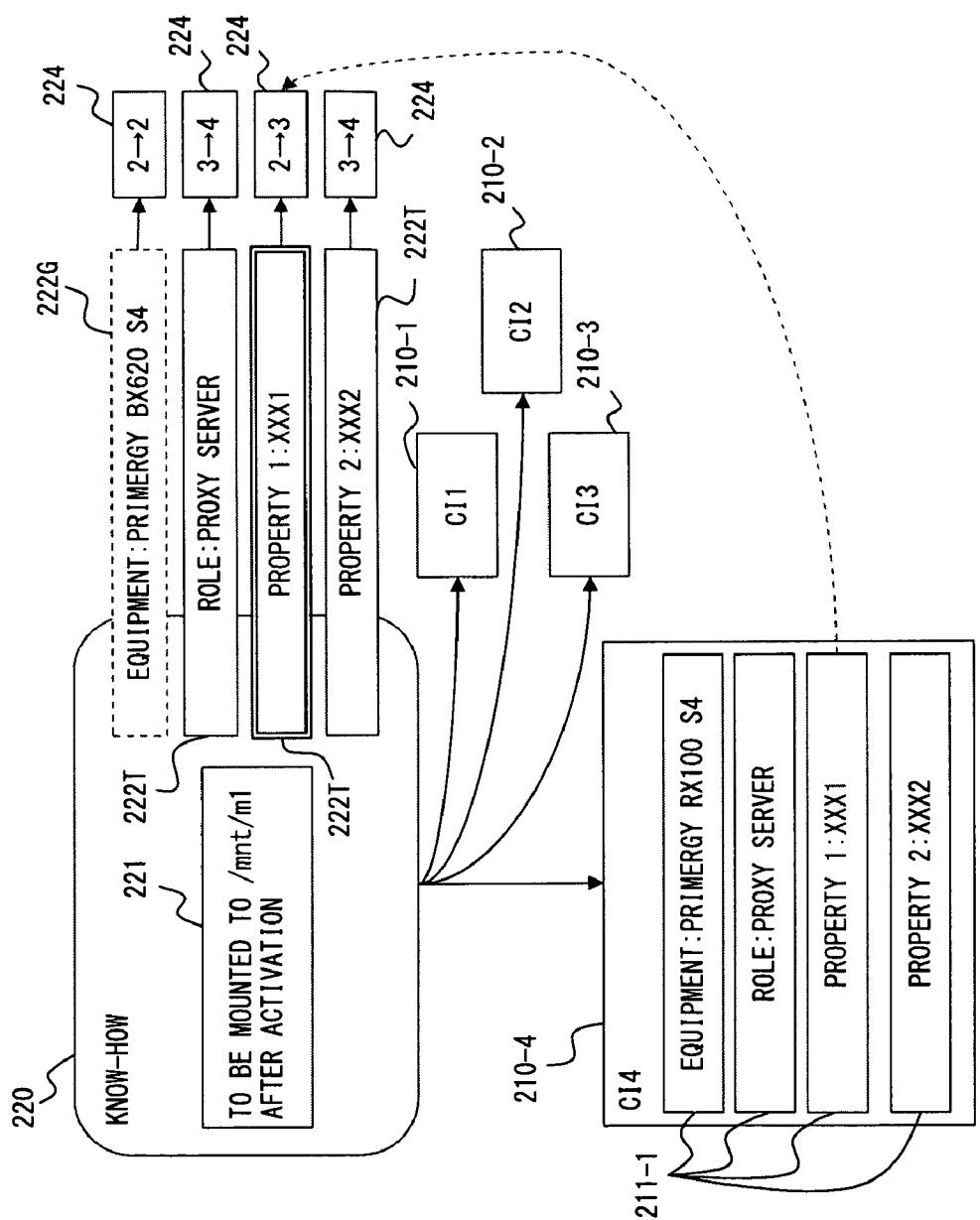
FIG. 16 is an explanatory view of the method of updating a set of "property:value" of the know-how when a new CI is added to know-how.

Updating a set of "property:value" of know-how associated with the addition of a new CI FIG. 16 is an explanatory view of the method of updating a set of "property:value" 222 of the know-how 220 when a new CI 210 is added to know-how 220 as in the example shown in (III) above.

In FIG. 16, the case shown in FIG. 13 is exemplified.

As shown in FIG. 13, when the CI 210-4 is newly added to the know-how 220, the value of the common number counter 224 corresponding to each set of "property:value" 222 of the know-how 220 is changed as shown in FIG. 16. In this case, the value of the common number counter 224 corresponding to the set of "property 1: XXX 1" 222G is increased from "2" to "3". It indicates that the set of "property 1: XXX 1" 222G is the set of "property:value" 222 common among the three CIs 210 in the four CIs 210-1, 210-4, 210-3, and 2104 associated with the know-how 220. Thus, when a new CI 210 is added to (stored in) the CMDB 200, it is checked whether or not the set of "property:value" 222G stored as learning data in the know-how 220 is a set of "property:value" stored in a number of CIs 210 associated with the know-how 220. If it is a set of "property:value" common to a number of CIs 210, then the set of "property:value" 222G is stored as the set of "property:value" 222T of the know-how 220.

As described above in the present embodiment, the set of "property:value" 222 that was not stored in the past is registered as learning data, and each time a new CI 210 is added to the CMDB 200, the learning data is re-evaluated. The re-evaluation is performed by determining, for example, whether or not the learning data is the set of "property:value" 222 common to a number of CIs 210 associated with the know-how 220.

Figure 17:
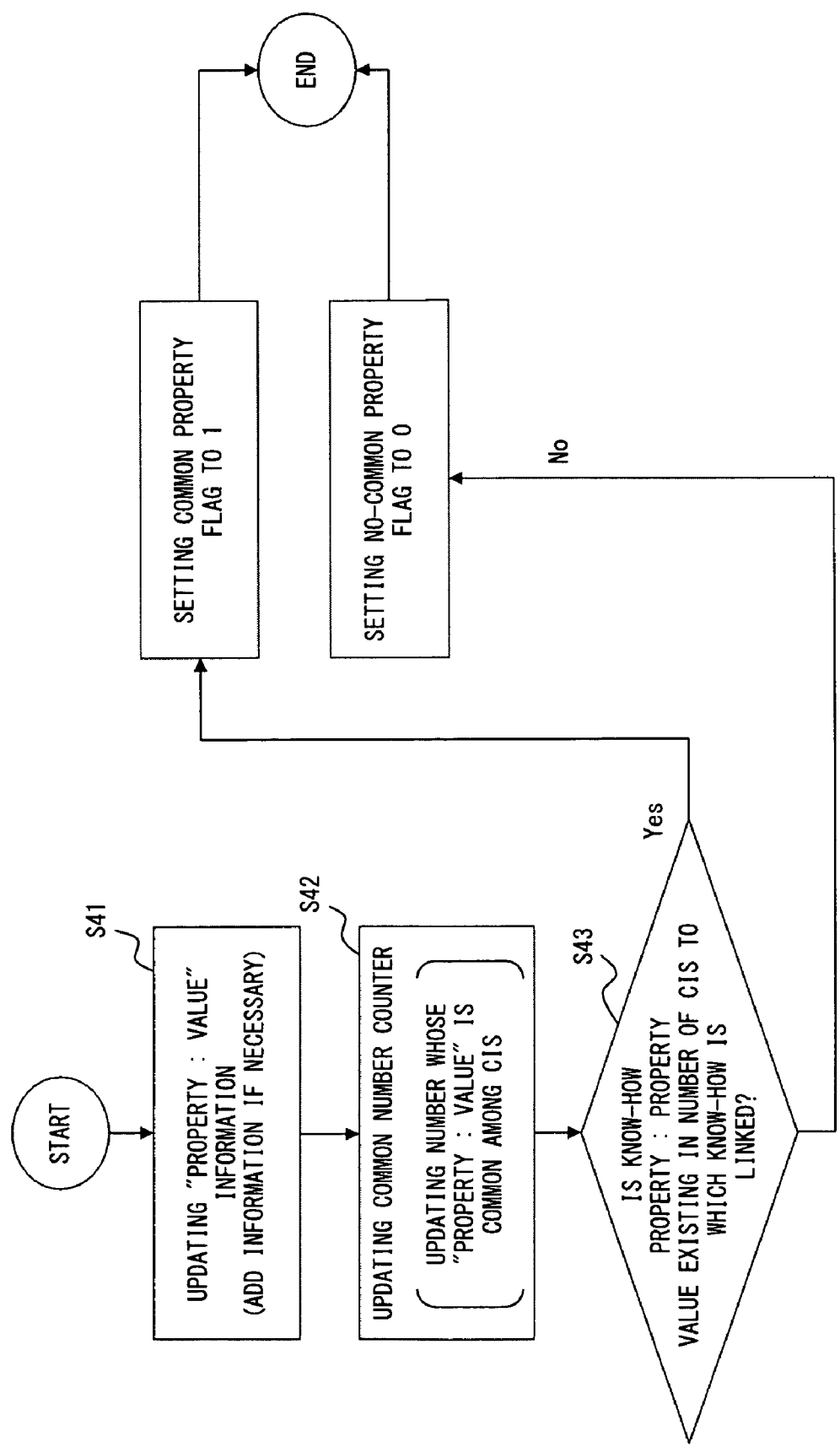
FIG. 17 is a flowchart showing the procedure of realizing the "method of updating a set of "property:value" stored in know-how"

FIG. 17 is a flowchart showing the procedure of realizing the "method of updating a set of "property:value" registered in know-how 222" shown in FIG. 16. The process shown in the flowchart is performed by the know-how 220 of the CMDB data update management unit 100. The process shown in the flowchart in FIG. 17 is performed by assuming that a new CI 210 is added to the CMDB 200 and one piece of know-how 220 in the CMDB 200 is associated with the CI 210.

The know-how 220 first updates the information about the set of "property:value" 222 of the know-how 220 (know-how 220 associated with the CI 210 newly added to the CMDB 200) (step S41). In this process, if the CI 210 newly associated with the know-how 220 is provided with the set of "property:value" not registered yet in the know-how 220 (in this case, including the set of "property:value" already registered as the learning data), then the set of "property:value" is added to the know-how 220.

The value of the common number counter 224 of each set of "property:value" 222 of the know-how 220 is updated (step S42). The process is to update the numbers of common sets of the set of "property:value" 211 of the CI 210 associated with to the know-how 220 and the "property:value" 222 of the CI 210 newly associated with the know-how 220. Therefore, if the set of "property:value" 211 provided for the CI 210 newly associated with the know-how 220 matches the set of "property:value" 222 registered in the know-how 220, then the value of the common number counter 224 corresponding to the set of "property:value" 222 is increased by "1".

Next, the value of each of the common number counters 224 of all sets of "property:value" 222 registered in the know-how 220 is checked, and it is determined whether or not each set of "property:value" 222 is the set of "property:value" 211 in a number of CIs 210 associated with to the know-how 220 (step S43). The determination is performed by, for example, checking whether or not the following conditional expression (1) is satisfied.

$$\text{rate of including the set of "property:value" } 222 > 0.5 \qquad (1)$$

where the rate of including the set of "property:value" 222 is equal to the value of common number counter 224/total number of CIs 210 associated with the know-how 220.

If the set of "property:value" 222 of the know-how 220 is the set of "property:value" 211 in the large number of CIs 210 (YES in step S43), then the common property flag 223 corresponding to the set of "property:value" 222 is set to "1", and the process of the present flowchart is terminated. On the other hand, unless it is the set of "property:value" 211 in the large number of CIs 210 (NO in step S43), the common property flag 223 corresponding to the set of "property:value" 222 is set to "0", thereby terminating the process of the present flowchart.

[Hardware Configuration of a Computer for Realizing the Present Embodiment by the Execution of a Program]

The configuration information management apparatus 10 according to the present embodiment can be realized by a computer such as a database server etc. In this case, the CMDB data update management unit 100 can be realized by executing software (configuration information management program) by the computer. With the configuration, the CMDB 200 is a database in which data is managed by the configuration information management program.

Figure 18:
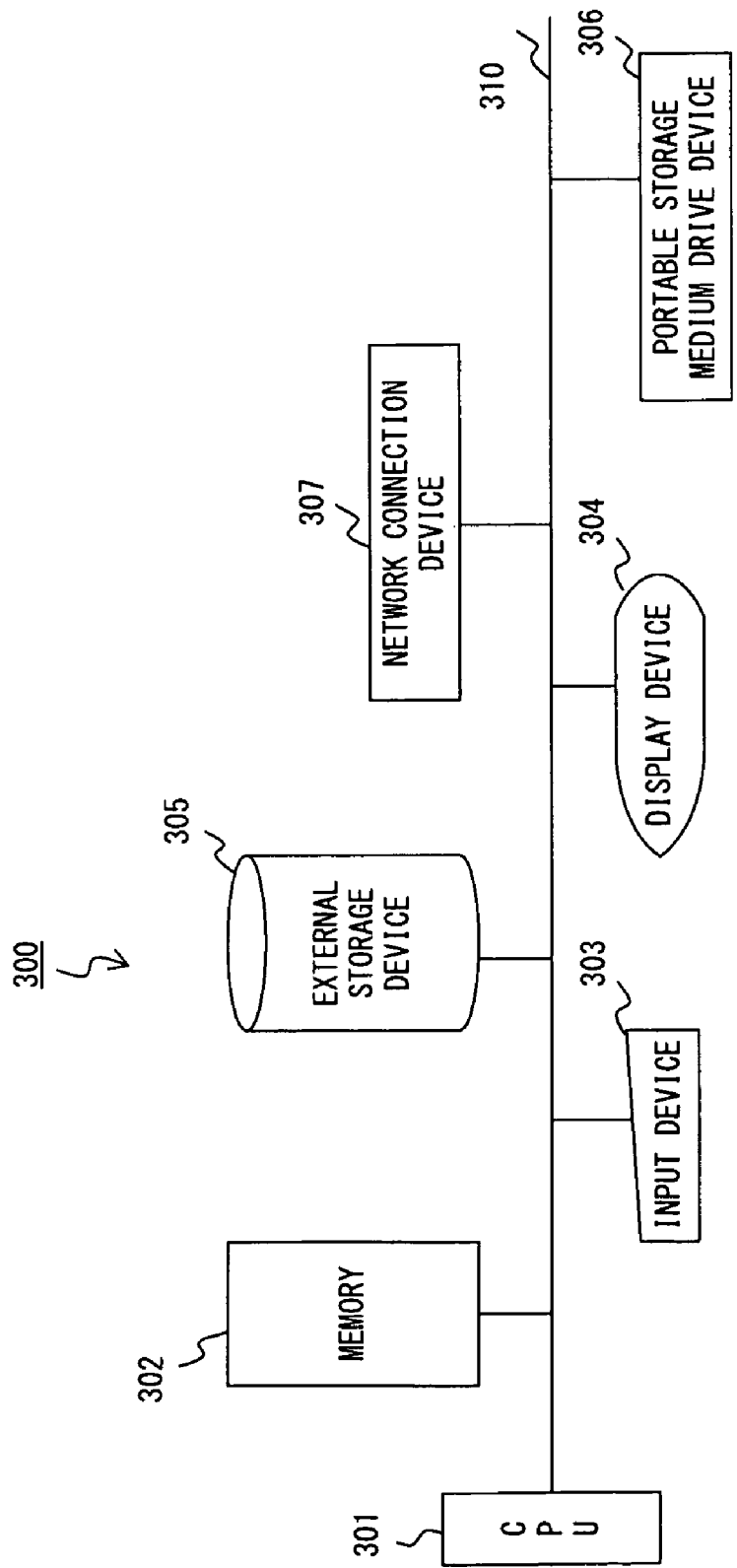
FIG. 18 is a block diagram showing the hardware configuration of a computer for realizing the CMDB data update management unit of the configuration information management apparatus according to an embodiment of the present invention by executing a program.

FIG. 18 is a block diagram showing the hardware configuration of a computer for realizing the CMDB data update management unit 100 of the configuration information management apparatus 10 according to the present embodiment by executing the configuration management program.

A computer 300 shown in FIG. 18 includes a CPU 301, memory 302, an input device 303, a display device 304, an external storage device 305, a portable storage medium drive device 306, a network connection device 307, etc. The CPU 301 is connected to the other components 302 through 307 of the computer 300 via a bus 310.

The CPU 301 is a central processing unit for controlling the operation of the entire system of the computer 300. The memory 302 has an area for loading the configuration program to be executed by the 301, a work area for storing intermediate data when the configuration program is executed, etc. The input device 303 has a keyboard, a mouse, etc. The display device 304 can be a CRT display, a liquid crystal display, etc. The external storage device 305 is an HDD (hard disk drive), etc. The portable storage medium drive device 306 reads and writes data stored in a portable storage medium (a non-transitory machine readable storage medium) such as a CD (compact disc), a DVD (digital video disc), USB memory, etc. The network connection device 307 is a network card etc. for connection to a LAN (local area network) etc. configured in a data center and an in-house system. The LAN is connected is connected to the Internet and a WAN (wide area network) such as a VPN (virtual private network) etc. through network equipment such as a router etc.

The configuration information management program according to the present embodiment is stored in a portable storage medium and distributed through a portable storage medium. The configuration management program can also be downloaded and installed on the external storage device 305 and a portable storage medium inserted into the portable storage medium drive device 306 through a network such as the Internet.

The configuration information management program installed on the external storage device 305 etc. is activated by an operation of a mouse as the external storage device 305 through a user interface screen such as a GUI screen etc. displayed on the display device 304. The CMDB 200 is configured on, for example, the external storage device 305. The configuring operation of the CMDB 200 is performed by a system administrator in an inputting operation etc. from the input device 303 on the GUI screen. The manual operations in (I) and (II) above are performed by the system administrator performing an inputting operation from the input device 303 on the user interface screen. The automatic process of the configuration information management apparatus 10 in (I) through (IV) above can be automatically processed by the CPU 301 executing the configuration information management program loaded into the memory 302.

In addition, the function of the CMDB data update management unit 100 of the configuration information management apparatus 10 according to the present embodiment can be provided for a client by executing the configuration information management program of the present embodiment by the server held by the ASP (application service provider). However, Saas (software as a server) can also provides a client with the function of the configuration information management program according to the present embodiment through the Internet.

According to the present embodiment, in the CMDB 200, the know-how common among the same sets of "property:value" is stored as associated with the CI 210 in which the "property:value" is stored. Therefore, a piece of know-how can be shared in a plurality of CI 210. In addition, according to the present embodiment, the know-how 220 is associated with the CI 210 on the basis of a set of "property:value". Therefore, the know-how 220 and the CI 210 can be defined by the relationship of know-how 220: CI 210=n:m (n and m are natural numbers). In addition, since the know-how 220 can be stored without duplication in the CMDB 200, a necessary storage capacity can be reduced in configuring the CMDB 200.

The present invention is not limited to the above-mentioned present embodiments, but can be realized as various forms within the scope of the gist of the present invention. For example, the method for associating know-how with a CI is not limited to the type of using the ID, but a link can be established by a pointer pointing to the address of the CI. In addition, the determination criteria on the similarity when a CI newly added to the CMDB is associated with know-how is not limited to the above-mentioned examples of the embodiments, but can be appropriate set. Furthermore, the condition of adopting the learning data as a set of "property:value" of know-how can also be set appropriately.

What is claimed is:

1. A configuration information management apparatus which manages a configuration item of an information system and property information of the configuration item, the configuration information management apparatus comprising:
   a database that stores a configuration item including a set of a property and a value, and knowledge information relating to the set of the property and the value; and
   a computer to perform the configuration information management including;
      associating the configuration item with the knowledge information on a basis of the set of the property and the value of the configuration item, and storing the associated configuration item and knowledge information in the database;
      when a new configuration item is added to the database, determining similarity between the set of the property and the value of the configuration item associated with the knowledge information and a set of a property and a value of the new configuration item; and
      associating the new configuration item with knowledge information associated with a configuration item having similarity higher than a predetermined threshold on a basis of the determination result obtained by the determining.

2. The apparatus according to claim 1, wherein
the knowledge information includes a set of a property and a value common among a number of configuration items associated with the knowledge information.

3. The apparatus according to claim 2, wherein
the knowledge information includes as learning data a set of a property and a value not common among a number of configuration items associated with the knowledge information.

4. The apparatus according to claim 1, wherein
when the new configuration item is associated with knowledge information, it is determined to what extent the learning data of the knowledge information is shared among the configuration items associated with the knowledge information, and the learning data is registered as a set of a property and a value of the knowledge information when the extent of the share is high.

5. The apparatus according to claim 1, wherein:
when a configuration item is first associated with knowledge information, a set of a property and a value of the configuration item as a set of a property and a value of the knowledge information are set provisionally; and
when a new configuration item is associated with the knowledge information, the provisional set of the property and the value common to the set of a property and a value of the new configuration item is registered as the set of the property and the value of the knowledge information.

6. The apparatus according to claim 1, wherein
the knowledge information comprises:
know-how information;
a set of a property and a value:
a common property flag indicating whether or not there is the set of the property and the value having the know-how information in a number of configuration items;
a common number counter counting a number of configuration items whose sets of the property and the value are stored; and
link information associating the know-how with a configuration item related to the knowledge information.

7. A configuration information management apparatus which manages a configuration item of an information system and its property information of the configuration item, the configuration information management apparatus comprising:
- a database that stores property information about a configuration item of an information system and a configuration item including a set of a property and a value and knowledge information relating to the set of the property and the value; and
- a computer to perform the configuration information management including;
    - when a new configuration item is added to the database, determining similarity between the set of the property and the value of the configuration item associated with the knowledge information and a set of a property and a value of the new configuration item; and
    - associating the new configuration item with knowledge information associated with a configuration item having similarity higher than a predetermined threshold on a basis of the determination result obtained by the determining.

8. The apparatus according to claim 7, wherein
the knowledge information comprises:
know-how information;
a set of a property and a value:
a common property flag indicating whether or not there is the set of the property and the value having the know-how information in a number of configuration items;
a common number counter counting a number of configuration items whose sets of the property and the value are stored; and
link information associating the know-how with a configuration item related to the knowledge information.

9. A non-transitory machine readable storage medium storing a program used to direct a computer to function as a configuration information management apparatus which manages a configuration item of an information system and property information of the configuration item, the program causing the computer to execute a procedure, the procedure comprising:
- storing in a database storing property information about a configuration item of the information system and a configuration item including a set of a property and a value and knowledge information relating to the set of the property and the value;
- associating the configuration item with the knowledge information on a basis of the set of the property and the value of the configuration item, and storing related the configuration item and the knowledge information in the database; and
- when a new configuration item is added to the database, determining similarity between the set of the property and the value of the configuration item associated with the knowledge information and a set of a property and a value of the new configuration item;
- wherein the new configuration item is associated with knowledge information associated with a configuration item having similarity higher than a predetermined threshold on a basis of the determining.

10. The non-transitory machine readable storage medium according to claim 9, wherein
the knowledge information includes a set of a property and a value common among a number of configuration items associated with the knowledge information.

11. The non-transitory machine readable storage medium according to claim 10, wherein
the knowledge information includes as learning data a set of a property and a value not common among a number of configuration items associated with the knowledge information.

12. The non-transitory machine readable storage medium according to claim 9, wherein
when the new configuration item is associated with knowledge information, it is determined to what extent the learning data of the knowledge information is shared among the configuration items associated with the knowledge information, and the learning data is registered as a set of a property and a value of the knowledge information when the extent of the share is high.

13. The non-transitory machine readable storage medium according to claim 9, wherein
when a configuration item is first associated with knowledge information, the management device provisionally sets a set of a property and a value of the configuration item as a set of a property and a value the knowledge information; and
when a new configuration item is associated with the knowledge information, the provisionally set of the property and the value common to the set of a property and a value of the new configuration item is stored as the set of the property and the value of the knowledge information.

14. The non-transitory machine readable storage medium according to claim 9, wherein
the knowledge information comprises:
know-how information;
a set of a property and a value:
a common property flag indicating whether or not there is the set of the property and the value having the know-how information in a number of configuration items;
a common number counter counting a number of configuration items whose sets of the property and the value are stored; and
link information associating the know-how with a configuration item related to the knowledge information.

15. A non-transitory machine readable storage medium storing a program used to direct a computer to function as a configuration information management apparatus which manages a configuration item of an information system and property information of the configuration item, the program causing the computer to execute a procedure, the procedure comprising:
- storing property information about a configuration item of an information system and a configuration item including a set of a property and a value and knowledge information associated with the set of the property and the value; and
- when a new configuration item is added to the database, determining similarity between the set of the property and the value of the configuration item associated with the knowledge information and a set of a property and a value of the new configuration item;
- wherein the new configuration item is associated with knowledge information associated with a configuration item having similarity higher than a predetermined threshold on a basis of the determination result obtained by the determining.

16. The non-transitory machine readable storage medium according to claim 15, wherein
the knowledge information comprises:
know-how information;
a set of a property and a value:
a common property flag indicating whether or not there is the set of the property and the value having the know-how information in a number of configuration items;
a common number counter counting a number of configuration items whose sets of the property and the value are stored; and
link information associating the know-how with a configuration item related to the knowledge information.

17. A configuration information management method for managing a configuration item of an information system and property information of the configuration item, the configuration information management method comprising:
storing property information about the configuration item of the information system and knowledge information a configuration item including a set of a property and a value and knowledge information relating to the set of the property and the value in a database; and
associating the configuration item with the knowledge information on a basis of the set of the property and the value of the configuration item, and storing related the configuration item and the knowledge information in the database; and
when a new configuration item is added to the database, determining similarity between the set of the property and the value of the configuration item associated with the knowledge information and a set of a property and a value of the new configuration item;
wherein in the managing, associating the new configuration item with knowledge information associated with a configuration item having similarity higher than a predetermined threshold on a basis of the determination result obtained by the determining step.

* * * * *